(12) United States Patent
Kretsch et al.

(10) Patent No.: US 10,442,560 B2
(45) Date of Patent: Oct. 15, 2019

(54) CAPTURE SYSTEM AND METHOD

(71) Applicant: LOCKHEED MARTIN CORPORATION, Bethesda, MD (US)

(72) Inventors: Warren E. Kretsch, Littleton, CO (US); Joshua Benjamin Hopkins, Littleton, CO (US); Lowell Travis Cogburn, Castle Rock, CO (US); David Westin Wurts, Morrison, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 354 days.

(21) Appl. No.: 15/441,132

(22) Filed: Feb. 23, 2017

(65) Prior Publication Data

US 2018/0237170 A1 Aug. 23, 2018

(51) Int. Cl.
*B64G 1/00* (2006.01)
*B64G 1/64* (2006.01)

(52) U.S. Cl.
CPC .................... *B64G 1/641* (2013.01)

(58) Field of Classification Search
CPC ......... B64G 1/64; B64G 1/646; B64G 1/1078
See application file for complete search history.

(56) References Cited

U.S. PATENT DOCUMENTS

| | | | | |
|---|---|---|---|---|
| 4,260,187 A | * | 4/1981 | Frosch | B64G 1/646 244/172.5 |
| 5,003,278 A | * | 3/1991 | May | H01F 17/06 174/92 |
| 6,126,115 A | * | 10/2000 | Carrier | B64G 1/641 244/137.4 |
| 2016/0130020 A1 | * | 5/2016 | Chambert | B64G 1/1078 244/172.4 |

* cited by examiner

*Primary Examiner* — Richard G Davis
(74) *Attorney, Agent, or Firm* — Morgan, Lewis & Bockius LLP

(57) ABSTRACT

Transfer of objects between spacecraft can be achieved in a low gravity environment. A capture device can be part of a module that facilitates visualization of a vessel that approaches the capture device. The module can facilitate positioning of the capture device for reception of the vessel. The capture device can include spring-loaded locking arms that both allow receipt and prevent escape of the vessel. At least a portion of each locking arm can extend radially inwardly and axially toward a cushion damper of the capture device. The locking arms can move radially away from each other upon application of a force from the vessel that is axially toward the cushion damper. The locking arms can move radially toward each other upon application of a force from the vessel that is axially away from the cushion damper.

19 Claims, 7 Drawing Sheets

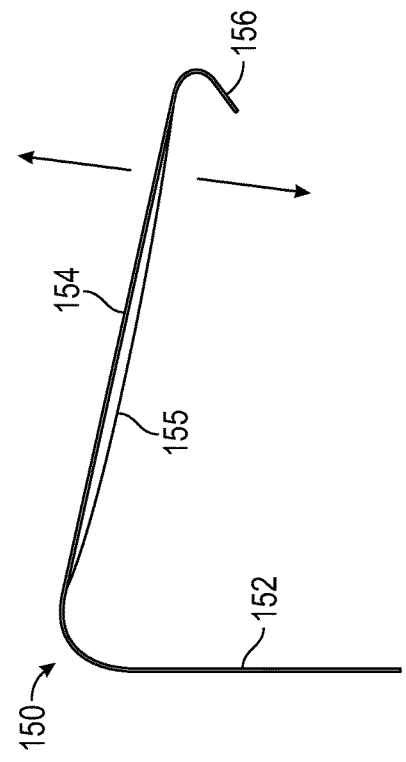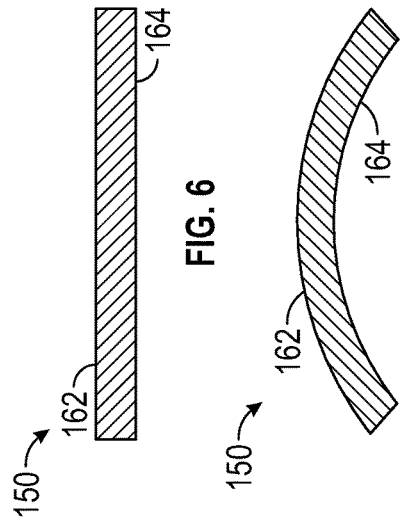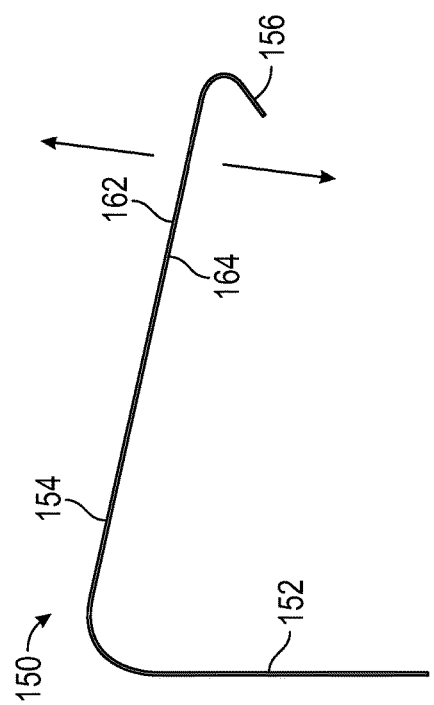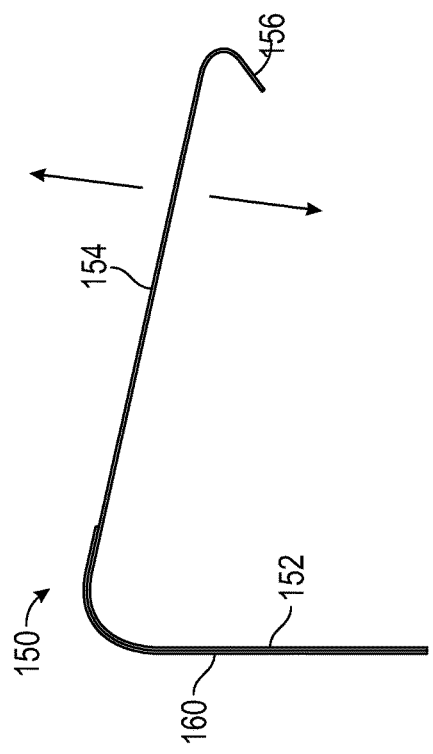

CAPTURE SYSTEM AND METHOD

STATEMENT REGARDING FEDERALLY SPONSORED RESEARCH OR DEVELOPMENT

Not applicable.

BACKGROUND

Field

The present disclosure generally relates to capture of objects in low gravity or zero gravity environments.

Description of the Related Art

Space flight can be used to transport cargo from one astronomical body to another astronomical body. For example, space missions can be initiated from one astronomical body, such as the Earth, to collect samples from another astronomical body, such as the moon, another planet, or other objects in space. It can be desirable to transport the samples or other cargo for analysis or other processing.

SUMMARY

The subject technology is illustrated, for example, according to various aspects described below.

According to some embodiments, a capture device for capturing a vessel can include: an upper housing; one or more locking arms, wherein, in a relaxed configuration, at least a portion of each locking arm extends radially inwardly from a periphery of the upper housing and axially toward a cushion damper of the upper housing; a lower housing; and a hinge rotatably connecting the upper housing to the lower housing.

From the relaxed configuration, the one or more locking arms can be configured to move radially away from each other upon application of forces axially toward the upper housing, and to move radially toward each other upon application of a force axially away from the upper housing. In the relaxed configuration, a maximum distance separating a pair of the one or more locking arms can be smaller than a maximum cross-sectional dimension of the vessel.

The one or more locking arms can bend with respect to the upper housing. Each locking arm can include a first segment coupled to the upper housing, a second segment comprising the at least a portion that extends radially inwardly from the periphery and axially toward the cushion damper, and a third segment extending radially outwardly from the second segment and axially toward the cushion damper.

Each locking arm can include convex outer surface facing away from the upper housing and a concave inner surface facing toward the upper housing. Each locking arm can articulate about a pivot with respect to the upper housing. The capture device can further include a spring connected to the upper housing and the locking arm and being configured to urge the locking arm to the relaxed configuration. The upper housing can include a cushion damper. The lower housing can include a cradle. When the lower housing is closed against the upper housing, the cushion damper and the cradle both can be in contact with the vessel to secure the vessel with respect to the capture device.

According to some embodiments, a method of capturing a vessel within a capture device can include: positioning an upper housing of a capture device to be along a trajectory of a vessel; receiving the vessel between one or more locking arms of the capture device and the upper housing by facilitating movement of the one or more locking arms radially away from each other upon application of a force from the vessel that is axially toward a cushion damper of the upper housing; retaining the vessel between the one or more locking arms and the upper housing by facilitating movement of the one or more locking arms radially toward each other upon application of a force from the vessel that is axially away from the cushion damper.

The method can further include closing a lower housing of the capture device against the upper housing. The closing can include securing the vessel between and in contact with both a cushion damper of the upper housing and a cradle of the lower housing. The vessel can travel along the trajectory in a zero gravity environment.

Receiving the vessel can include enlarging a maximum distance separating a pair of the one or more locking arms to be larger than a maximum cross-sectional dimension of the vessel. Receiving the vessel can include facilitating rotation of each of the one or more locking arms about a pivot. Receiving the vessel can include facilitating bending of each of the one or more locking arms with respect to the upper housing. Receiving the vessel can include receiving the vessel with a convex outer surface of the one or more locking arms, the convex outer surface facing away from the upper housing. Retaining the vessel can include retaining the vessel with a concave inner surface of the one or more locking arms, the concave inner surface facing toward the upper housing.

In the following description, specific embodiments are described to shown by way of illustration how the invention may be practiced. It is to be understood that other embodiments may be utilized and changes may be made without departing from the scope of the present invention.

BRIEF DESCRIPTION OF THE DRAWINGS

FIG. 3 illustrates a side view of a locking arm, according to some embodiments of the present disclosure.

FIG. 4 illustrates a side view of a locking arm, according to some embodiments of the present disclosure.

FIG. 5 illustrates a side view of a locking arm, according to some embodiments of the present disclosure.

FIG. 6 illustrates a sectional view of a locking arm, according to some embodiments of the present disclosure.

FIG. 7 illustrates a sectional view of a locking arm, according to some embodiments of the present disclosure.

DETAILED DESCRIPTION

Samples and other cargo can be transferred between spacecraft in preparation for further transport. Conventionally, objects are transferred between spacecraft in low gravity environment by securely docking the spacecraft together. The docking process can require a high degree of precision and presents the risk of damage to one or both spacecraft involved. Furthermore, docking can be problematic for an autonomous system.

According to embodiments of the present disclosure, systems described herein can facilitate the transfer of objects between spacecraft without docking. For example, an object can be encapsulated within a vessel that is launched along a trajectory towards a capture device, which can further transport the vessel. The capture device must be capable of positioning itself to be aligned with the trajectory of the vessel. According to embodiments of the present disclosure, the capture device can be part of a module that facilitates visualization of the vessel as it approaches the capture device. The module can further allow the capture device to achieve a position and orientation that is appropriate for receiving and retaining the vessel.

Furthermore, the capture device must be capable of receiving and retaining the vessel while avoiding damage. According to embodiments of the present disclosure, the capture device can include spring-loaded locking arms that both allow receipt and prevent escape of the vessel. Upon interaction with the capture device, the vessel may have a tendency to ricochet due to its high kinetic energy and/or low spring stiffness of the locking arms. Thus, the same locking arms are compliant enough to allow entry and resilient enough to prevent escape of the vessel. Furthermore, interaction of the locking arms with the vessel upon entry can be asymmetrical to the interaction of the locking arms with the vessel as it attempts to escape.

Figure 1:
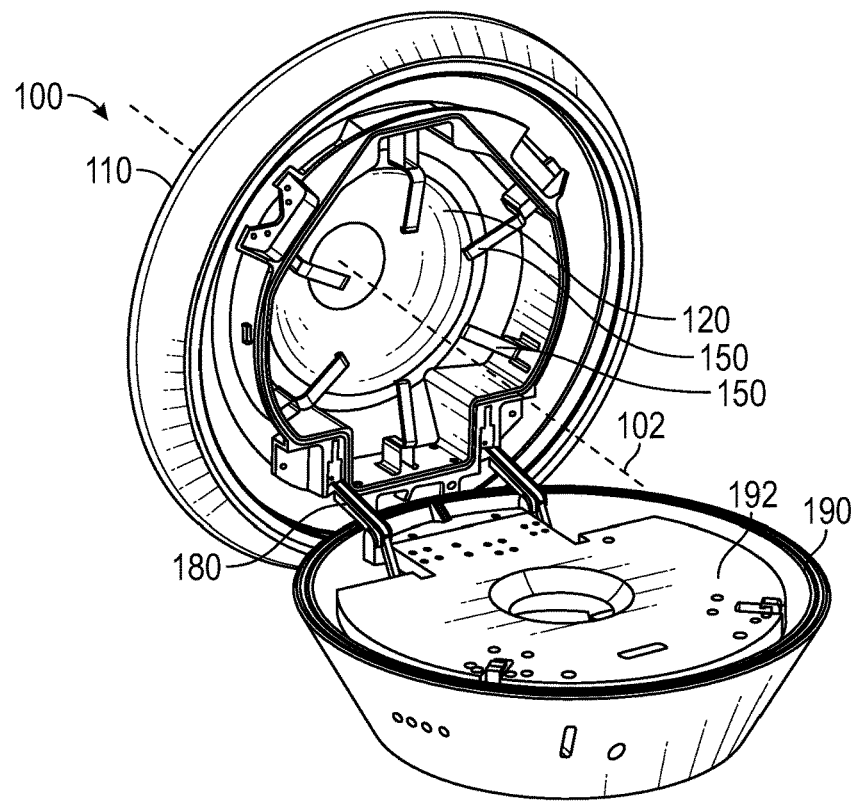
FIG. 1 illustrates a perspective view of a capture device, according to some embodiments of the present disclosure.
Figure 2:
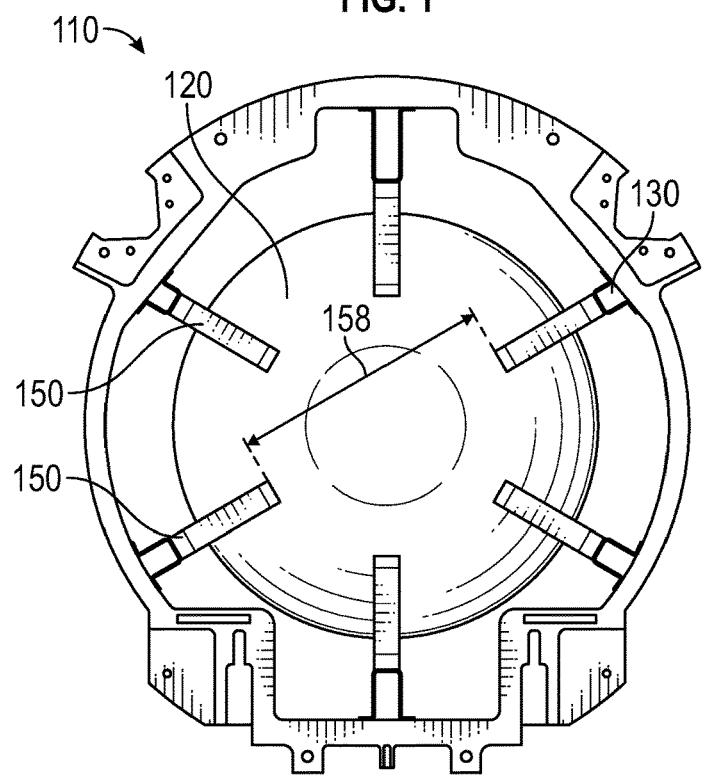
FIG. 2 illustrates a front view of an upper housing of the capture device of FIG. 1, according to some embodiments of the present disclosure.

According to some embodiments, a capture device can provide mechanisms to facilitate capture of a vessel. FIGS. 1-2 illustrate a capture device 100, according to some embodiments of the present disclosure. According to some embodiments, the capture device 100 can be an independent module or a component of another system. For example, the capture device 100 can be an extension of a vehicle for capturing the vessel. By further example, the capture device 100 can be a module that captures the vessel and transports it to another location. According to some embodiments, the capture device 100 can be used as a reentry vehicle for capturing the vessel in space and transporting the vessel into the atmosphere of a planet.

According to some embodiments, for example as illustrated in FIGS. 1-2, the capture device 100 can include an upper housing 110 and, optionally, a lower housing 190. Within the upper housing 110, a space can be provided between a cushion damper 120 and one or more locking arms 150. The space can be defined along a central axis 102 of the upper housing 110 that passes radially between locking arms 150 and through the cushion damper 120.

According to some embodiments, the locking arms can be configured to allow entry of a vessel into the space and resist escape of the vessel out of the space. According to some embodiments, for example as illustrated in FIGS. 1-2, each of the locking arms 150 can extend from a mounting 130 that is fixedly attached to the upper housing 110. The capture device 100 can include one or more locking arms 150. For example, the capture device 100 can include 1, 2, 3, 4, 5, 6, 7, 8, 9, 10, or more than 10 locking arms 150. The locking arms 150 can be, for example, distributed circumferentially about a periphery of the upper housing 110. At least a portion of each locking arm 150 extends radially inwardly from a periphery (e.g., a mounting 130) of the upper housing 110 and axially toward a portion of the upper housing 110, such as a cushion damper 120. From a relaxed configuration, the locking arms 150 are configured to move radially away from each other upon application of forces axially toward the upper housing 110, and to move radially toward each other upon application of a force axially away from the upper housing 110. For example, a vessel entering the space of the upper housing can, with its momentum, deflect the locking arms 150 radially outwardly away from each other. The vessel, attempting to exit the space such as after rebound from the cushion damper 120, can deflect the locking arms 150 radially inwardly toward each other. For example, a maximum distance 158 separating a pair of the locking arms 150 can provide receipt and retention of the vessel. For example, in the relaxed configuration, a maximum distance 158 separating a pair of the locking arms 150 is smaller than a maximum cross-sectional dimension of the vessel, as described further herein.

According to some embodiments, the cushion damper 120 can provide shock absorption upon receipt of and interaction with a vessel. The cushion damper 120 can include a material that has minimal rebound and coefficient of restitution. Furthermore, the cushion damper 120 can include a material that retains its shape during launch and after contact and interaction with the vessel. For example, the cushion damper 120 can include polystyrene or a thermal batting. The cushion damper 120 can absorb at least some of the momentum carried by the vessel. If the vessel does rebound off of the cushion damper 120, it may do so with reduced momentum, such that it is less likely to escape the space surrounded by the locking arms 150. Alternatively or in combination, the cushion damper 120 can include magnets, Velcro, and/or adhesives, for capturing and retaining the vessel.

The upper housing 110 and the lower housing 190 can transition between an open configuration and a closed configuration, for example, by pivoting about a hinge 180. For example, the hinge 180 can rotatably connect the upper housing 110 to the lower housing 190, as discussed further herein with respect to FIG. 10. The lower housing 190 can include a cradle 192 for contacting and supporting the vessel while the upper housing 110 and the lower housing 190 are in a closed configuration. While in the closed configuration, the cushion damper 120 and the cradle 192 can be sufficiently close to each other to simultaneously contact and support the vessel, such that movement of the vessel is minimized or eliminated while the capture device 100 is in the closed configuration, as discussed further herein with respect to FIGS. 12 and 13. At least a portion of the cushion damper and/or the cradle 192 can have a shape that conforms to at least a portion of the vessel. The capture device 100 can include control systems, communications mechanisms, and/ or propulsion for operation of the capture device 100. The capture device 100 can include a heat shield, for example on the upper housing 110, for use during reentry into an atmosphere.

According to some embodiments, the locking arms can facilitate both receipt and retention of a vessel into a space of a capture device. FIGS. 3-7 illustrate various designs for locking arms, according to some embodiments of the present disclosure. According to some embodiments, for example as illustrated in FIG. 3, a locking arm 150 can include a first segment 152 coupled to the upper housing 110 (e.g., a mounting 130). The locking arm 150 can include a second segment 154 that extends radially inwardly from the periphery of the upper housing 110 (e.g., a mounting 130) toward the central axis. The second segment 154 can also extend axially toward the central region of the cushion damper 120. Accordingly, outer surfaces 162 of the second segment 154 can receive an incoming vessel and be urged radially outwardly and axially toward the cushion damper 120. After the vessel is within the space (e.g., adjacent to the cushion damper 120), inner surfaces 164 of the second segment 154 can be urged radially inwardly and axially away from the cushion damper 120. Thus, the maximum distance 158 separating a pair of the locking arms 150 can increase upon entry of the vessel and decrease upon attempted exit of the vessel. The locking arm 150 can include a third segment 156 extending radially outwardly from the second segment 154 and axially toward the central region of the cushion damper 120. The second segment 154 can transition to the third segment 156 with a curved surface. The vessel can interact with an outer surface 162 of the second segment 154 upon entry, and the vessel can interact with an inner surface 164 of the second segment 154 after the vessel is within the space (e.g., adjacent to the cushion damper 120). Accordingly, the vessel can interact with flat and curved surfaces, rather than any sharp edges that might damage or catch on the vessel.

According to some embodiments, the locking arms 150 can be formed of thin sheets of material. For example, the locking arms 150 can include a metal, such as stainless steel, a metal alloy, a plastic, and/or another material. The material forming the locking arms 150 can be spring tempered to increase that material's upper limit of elasticity. The locking arms 150 can be elastically deformable while retaining their shape in the relaxed configuration. It will be appreciated that a variety of materials and dimensions can be used to achieve the capabilities described herein.

According to some embodiments, for example as illustrated in FIG. 4, a cambered spring can be formed with a surface orientation that facilitates bending. For example, at least a portion of the second segment 154 can be inclined to be cambered positively or negatively with respect to the first segment 152 and/or the third segment 156. Such a configuration can facilitate a preferential bending in a particular direction to facilitate receipt of a vessel.

According to some embodiments, for example as illustrated in FIG. 5, a supplemental segment 160 can extend along a length of the first segment 152 and/or the second segment 154. For example, the supplemental segment 160 can extend through a transition curve from the first segment 152 to the second segment 154. Accordingly, the bending of the first segment 152 relative to the second segment 154 can be modified by the rigidity of the supplemental segment 160. The supplemental segment 160 can have a flexibility that is the same or different than a flexibility of the second segment 154. The supplemental segment 160 can be of a material that is the same or different than a material of the second segment 154.

The locking arms can have a cross-sectional dimension that facilitates bending. According to some embodiments, for example as illustrated in FIG. 6, the locking arm 150 can have an outer surface 162 that faces away from the cushion damper 120 and an inner surface 164 that faces toward the cushion damper 120. The thickness between the outer surface 162 and the inner surface 164 can be substantially less than a width along the outer surface 162 and the inner surface 164. Such dimensions allow axial and radial bending without a tendency for substantial lateral movement of the locking arms 150.

The locking arms can have a cross-sectional dimension that facilitates bending in one direction more than in another direction. According to some embodiments, for example as illustrated in FIG. 7, the outer surface 162 facing away from the upper housing 110 (e.g., cushion damper 120) can be convex. Alternatively or in combination, the inner surface 164 facing toward the upper housing 110 (e.g., cushion damper 120) can be concave. For example, a convex feature of the second segment 154 (e.g., along the outer surface 162 thereof) can extend at least part of the distance between the first segment 152 and the third segment 156. By further example, a concave feature of the second segment 154 (e.g., along the inner surface 164 thereof) can extend at least part of the distance between the first segment 152 and the third segment 156. Accordingly, outer surfaces 162 of the second segment 154 can receive an incoming vessel and bend or buckle with a force to accommodate passage of the vessel. After the vessel is within the space (e.g., adjacent to the cushion damper 120), inner surfaces 164 of the second segment 154 can resist bending and buckling, so the vessel is retained within the space.

Figure 8:
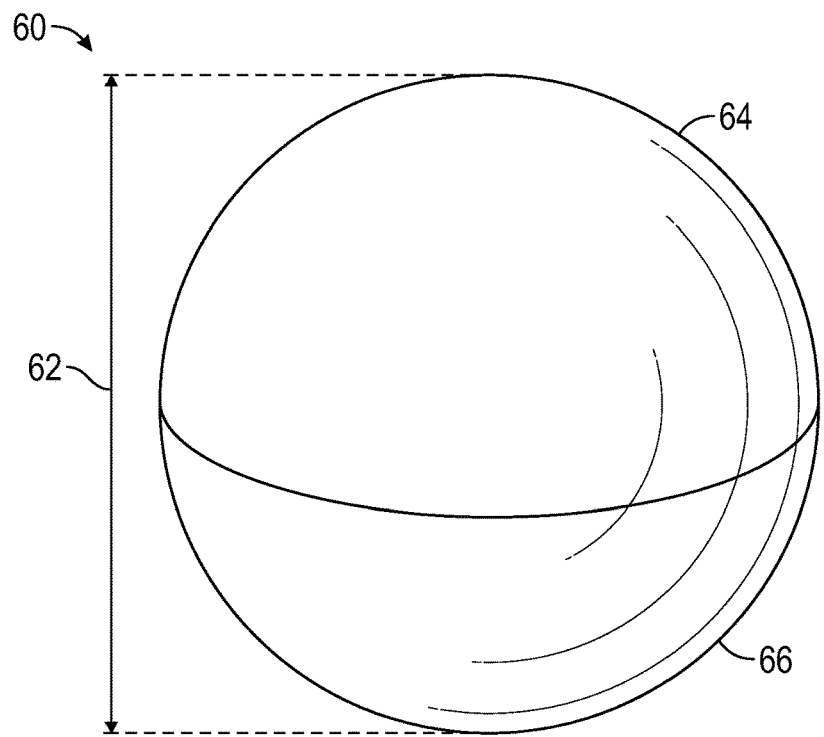
FIG. 8 illustrates a perspective view of a vessel, according to some embodiments of the present disclosure.
Figure 9:
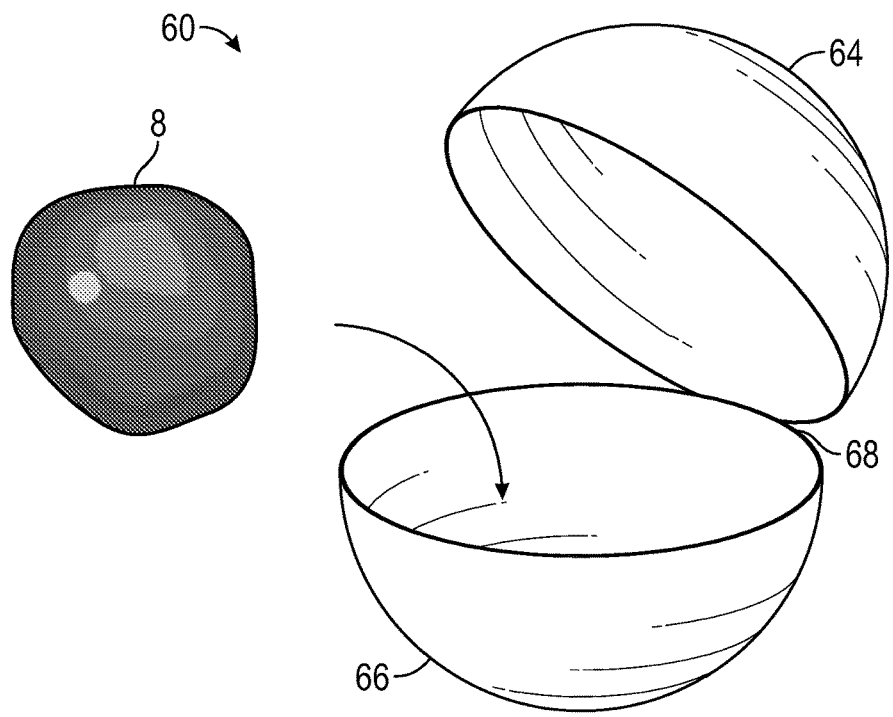
FIG. 9 illustrates a perspective view of a vessel, according to some embodiments of the present disclosure.

A vessel can encapsulate an object and be configured to interact with the capture device 100. According to some embodiments, for example as illustrated in FIGS. 8 and 9, a vessel 60 can include an upper portion 64 and the lower portion 66. The upper portion 64 and the lower portion 66 can transition between an open configuration and a closed configuration, for example, by pivoting about a hinge 68. For example, the hinge 68 can rotatably connect the upper portion 64 to the lower portion 66. The vessel can encapsulate an object within a space between the upper portion 64 and the lower portion 66. The vessel 60 can be generally spherical, such that the vessel 60 has a maximum cross-sectional dimension 62 that is substantially equal to any cross-sectional dimension that extends through a centroid of the vessel 60. Accordingly, the cross-sectional dimension from any direction is substantially the same regardless of the orientation of the vessel. According to some embodiments, the maximum cross-sectional dimension 62 of the vessel 60 is larger than the maximum distance 158 separating a pair of the locking arms 150, in the relaxed configuration.

A method of capturing a vessel with a capture device is described herein. The method can employ features of the system 1, as described herein, in a low-gravity or zero-gravity environment. For example, the features of the system 1 can be used in orbit or free-fall conditions, such that the net external forces on each of the features of the system 1 are the same.

Figure 10:
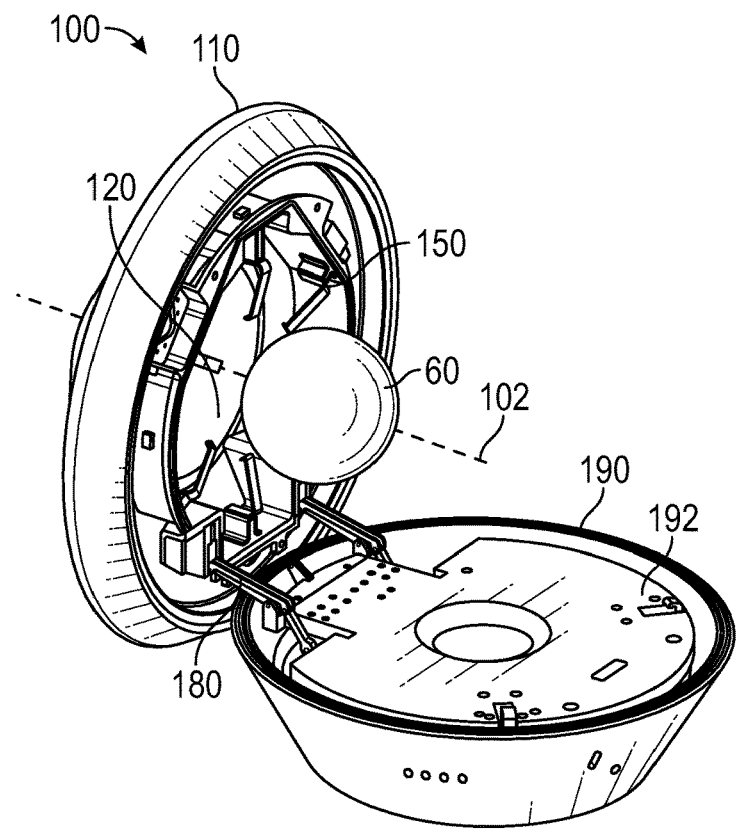
FIG. 10 illustrates a perspective view of a capture device, according to some embodiments of the present disclosure.

The capture device 100 can receive the vessel. FIG. 10 illustrates the capture device 100 as the vessel 60 approaches, according to some embodiments of the present disclosure. According to some embodiments, for example as illustrated in FIG. 10, the upper housing 110 can be positioned to be along a trajectory of a vessel 60. For example, the central axis 102 of the upper housing 110 can be aligned with the trajectory of the vessel 60. As the vessel 60 is received, the locking arms 150 can bend with respect to the upper housing 110. In particular, the locking arms 150 can move radially away from each other upon application of a force from the vessel 60, which is axially toward the upper housing 110 (e.g., cushion damper 120). For example, the maximum distance 158 separating a pair of the locking arms 150 can be enlarged to be larger than the maximum cross-sectional dimension 62 of the vessel 60. The vessel 60 is then permitted to enter the space within the upper housing 110 and/or interact with the cushion damper 120.

According to some embodiments, the capture device 100 is capable of capturing the vessel 60 even while the vessel 60 is not aligned with the central axis 102 of the upper housing 110. For example, if the vessel 60 is not aligned with the central axis 102, it may contact one or more of the locking arms 150 before contacting others of the locking arms 150. One or more of the locking arms 150 can urge the vessel 60 toward the central axis 102. Each of the locking arms 150 can tend to urge the vessel 60 toward the central axis 102, such that it can be received within the upper housing 110 despite misalignment. The cushion damper 120 can also have a shape (e.g., conical, tapered, etc.) that urges the vessel 60 toward the central axis 102. According to some embodiments, the vessel 60 can be spherical, such that the capture device 100 does not require the vessel 60 to be in any particular orientation. The capture device 100 can capture the vessel 60 while it is spinning or tumbling. Thus, the capture mechanism can be simpler and require fewer active controls than a system that requires precise positioning and orientation of a vessel.

Figure 11:
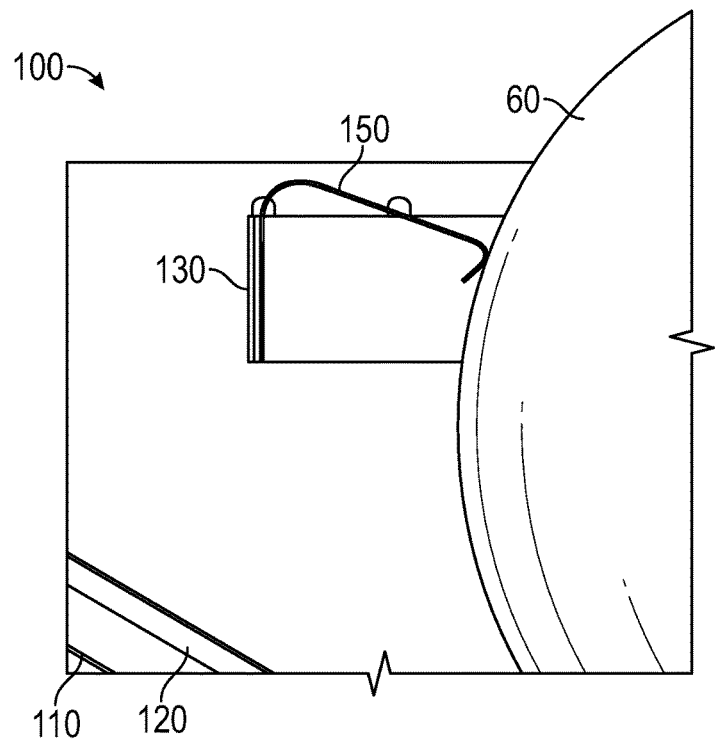
FIG. 11 illustrates a sectional view of the capture device of FIG. 10, according to some embodiments of the present disclosure.

The capture device 100 can retain the vessel. FIG. 11 illustrates the capture device 100 with the vessel 60, according to some embodiments of the present disclosure. According to some embodiments, for example as illustrated in FIG. 11, the locking arms 150 can move radially toward each other after the equator (e.g., maximum cross-sectional dimension) of the vessel 60 moves past the locking arms 150. If the vessel 60 rebounds and applied a force that is axially away from the upper housing 110 (e.g., cushion damper 120), then the locking arms 150 can move radially toward each other. This action, along with the spring characteristics of the locking arms 150, can urge the vessel 60 back toward the upper housing 110 (e.g., cushion damper 120). Capture of the vessel 60 can be verified using a camera and/or an illuminator within the capture device 100.

Figure 12:
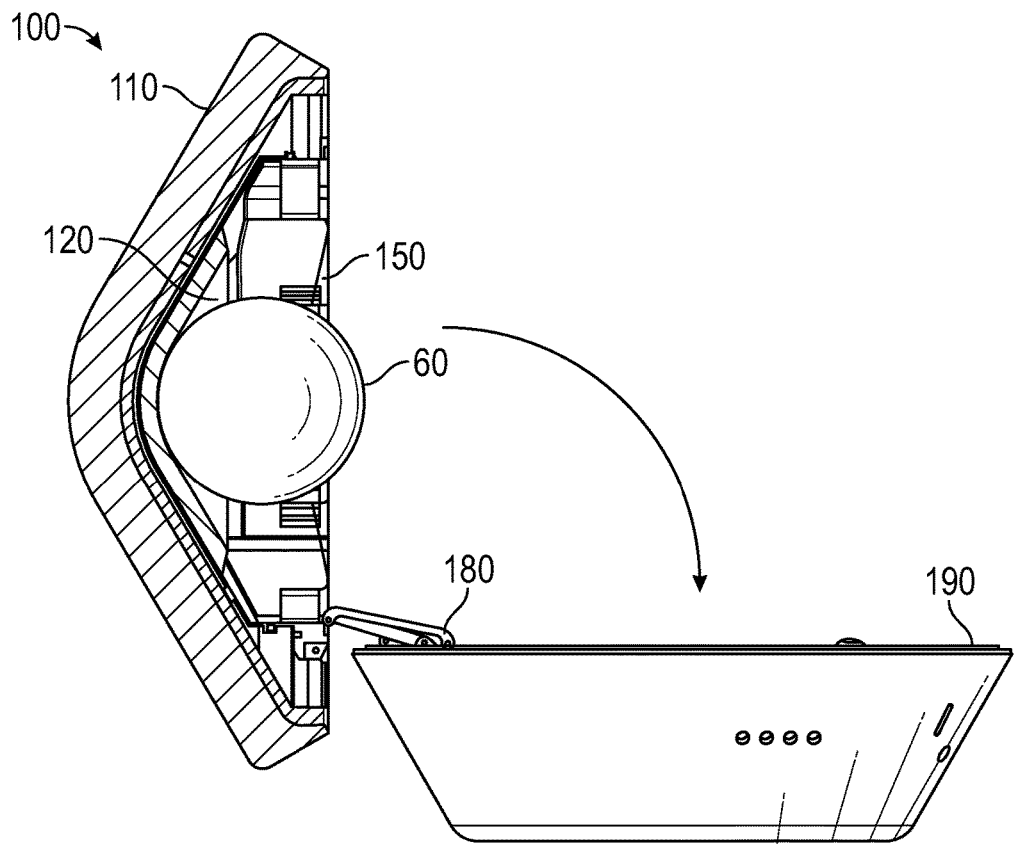
FIG. 12 illustrates a sectional view of the capture device of FIGS. 10 and 11, according to some embodiments of the present disclosure.
Figure 13:
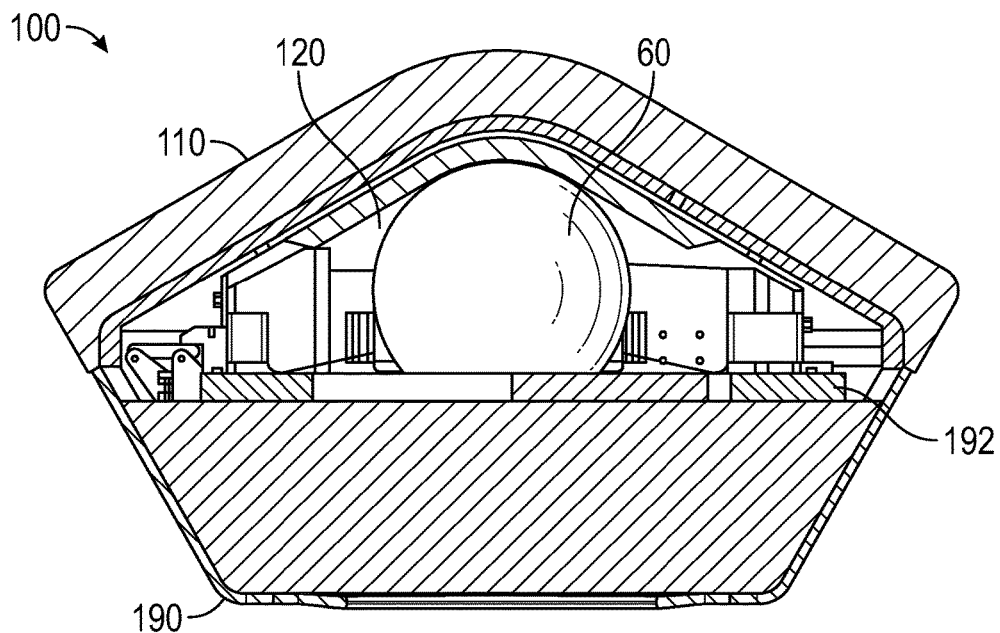
FIG. 13 illustrates a sectional view of the capture device of FIGS. 10-12, according to some embodiments of the present disclosure.

The capture device 100 can secure the vessel for transport. FIGS. 12 and 13 illustrate the capture device 100 with the vessel 60, according to some embodiments of the present disclosure. According to some embodiments, for example as illustrated in FIGS. 12 and 13, the capture device 100 can close by moving the upper housing 110 relative to the lower housing 190. When the lower housing 190 is against the upper housing 110, the vessel 60 can be secured between and in contact with both the cushion damper 120 of the upper housing 110 and the cradle 192 of the lower housing 190. In this configuration, the vessel 60 can have little or no movement with respect to the capture device 100. Closure of the capture device 100 can be verified, for example with microswitches.

Figure 14:
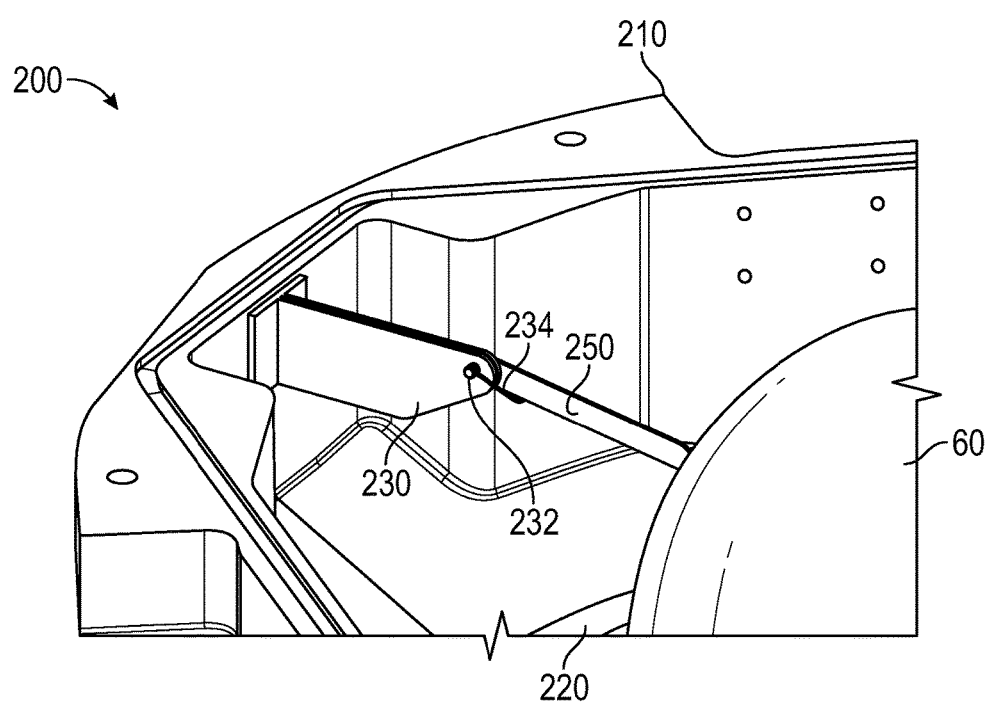
FIG. 14 illustrates a perspective view of a capture device, according to some embodiments of the present disclosure.
Figure 15:
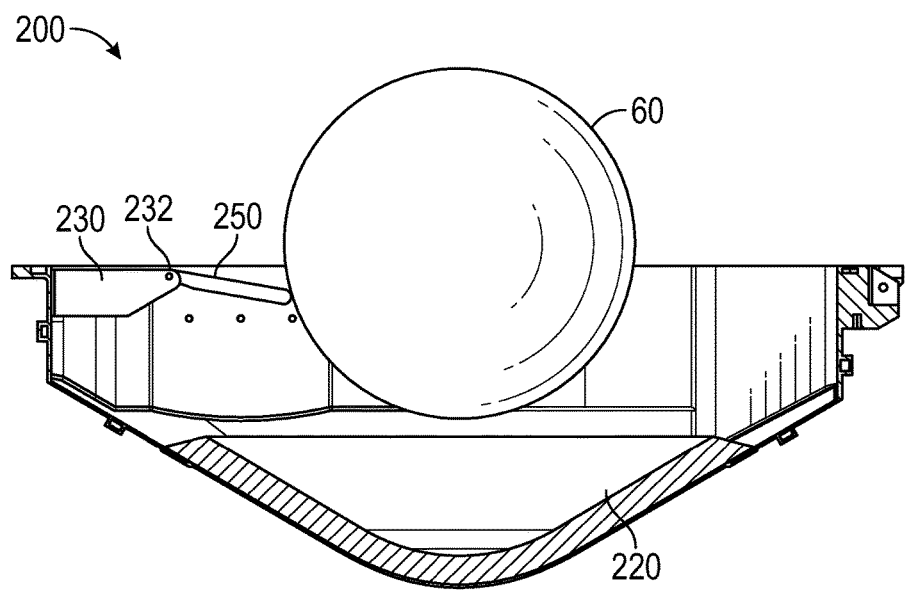
FIG. 15 illustrates a sectional view of the capture device of FIG. 14, according to some embodiments of the present disclosure.
Figure 16:
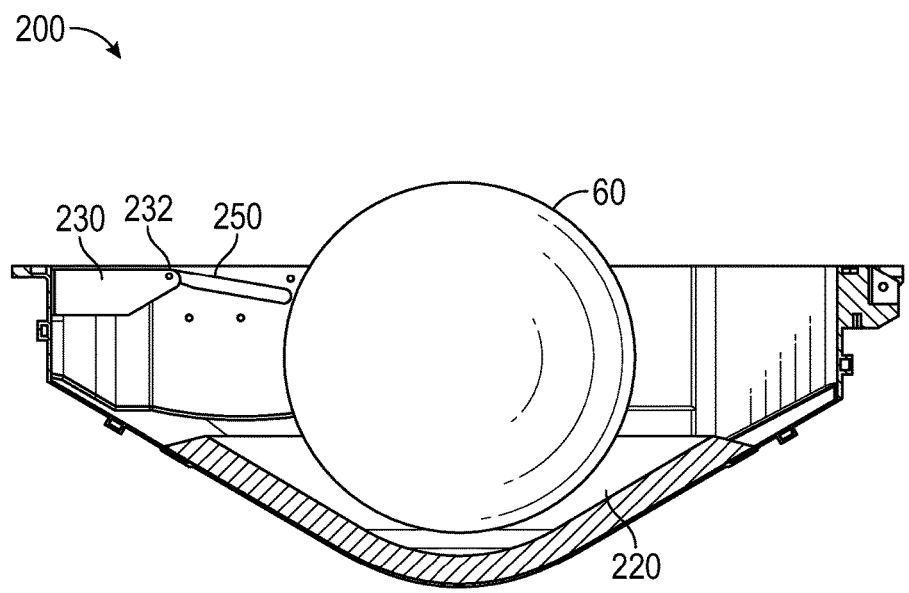
FIG. 16 illustrates a sectional view of the capture device of FIG. 14, according to some embodiments of the present disclosure.

According to some embodiments, a capture device can receive and retain a vessel with hinged locking arms. FIGS. 14-16 illustrate a capture device 200, according to some embodiments of the present disclosure. The capture device 200 can be similar in some respects to the capture device 100 of FIGS. 1-2 and therefore can be best understood with reference thereto. For example, the capture device 200 can be used in conjunction with the orbit module 30 as well as other components of the system 1.

According to some embodiments, for example as illustrated in FIG. 14, each of the locking arms 250 can extend from a mounting 230 that is fixedly attached to the upper housing 210 of the capture device 200. The capture device 200 can include one or more locking arms 250. For example, the capture device 200 can include 1, 2, 3, 4, 5, 6, 7, 8, 9, 10, or more than 10 locking arms 250. The locking arms 250 can be, for example, distributed circumferentially about a periphery of the upper housing 210. At least a portion of each locking arm 250 extends radially inwardly from a periphery (e.g., a mounting 230) of the upper housing 210 and axially toward a portion of the upper housing 210, such as a cushion damper 220. Each locking arm 250 can articulate about a pivot 232 with respect to the upper housing 210 (e.g., the mounting 230). A spring 234 can be connected to the upper housing 210 (e.g., the mounting 230) and the locking arm 250. The spring 234 can be biased to urge the locking arm 250 to the relaxed configuration, as discussed further herein.

From a relaxed configuration, the locking arms 250 are configured to move radially away from each other upon application of forces axially toward the upper housing 210, and to move radially toward each other upon application of a force axially away from the upper housing 210. For example, as shown in FIG. 15, a vessel entering the space of the upper housing can, with its momentum, deflect the locking arms 250 radially outwardly away from each other. The capture device 200 facilitates rotation of each of the locking arms 250 about the corresponding pivot 232 to move the locking arms 250. As shown in FIG. 16, the vessel, attempting to exit the space such as after rebound from the cushion damper 220, can deflect the locking arms 250 radially inwardly toward each other. For example, a maximum distance separating a pair of the locking arms 250 can provide receipt and retention of the vessel. For example, in the relaxed configuration, a maximum distance separating a pair of the locking arms 250 is smaller than a maximum cross-sectional dimension of the vessel. Once the vessel is within the upper housing 210, the vessel can be secured with a hard stop incorporated into or interacting with the locking arms 250. For example, the hard stop can prevent movement of the locking arms 250 beyond a certain point in a direction away from the cushion damper 220.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A capture device for capturing a vessel, the capture device comprising:
   an upper housing;
   one or more locking arms, wherein, in a relaxed configuration, at least a portion of each locking arm extends radially inwardly from a periphery of the upper housing and axially toward a cushion damper of the upper housing;
   a lower housing; and
   a hinge rotatably connecting the upper housing to the lower housing.

2. The capture device of claim 1, wherein, from the relaxed configuration, the one or more locking arms are configured to move radially away from each other upon application of forces axially toward the upper housing, and to move radially toward each other upon application of a force axially away from the upper housing.

3. The capture device of claim 1, wherein, in the relaxed configuration, a maximum distance separating a pair of the one or more locking arms is smaller than a maximum cross-sectional dimension of the vessel.

4. The capture device of claim 1, wherein the one or more locking arms bend with respect to the upper housing.

5. The capture device of claim 1, wherein each locking arm comprises a first segment coupled to the upper housing, a second segment comprising the at least a portion that extends radially inwardly from the periphery and axially toward the cushion damper, and a third segment extending radially outwardly from the second segment and axially toward the cushion damper.

6. The capture device of claim 1, wherein each locking arm comprises convex outer surface facing away from the upper housing and a concave inner surface facing toward the upper housing.

7. The capture device of claim 1, wherein each locking arm articulates about a pivot with respect to the upper housing.

8. The capture device of claim 1, further comprising a spring connected to the upper housing and the locking arm and being configured to urge the locking arm to the relaxed configuration.

9. The capture device of claim 1,
   wherein the upper housing comprises a cushion damper; and
   wherein the lower housing comprises a cradle.

10. The capture device of claim 9, wherein, when the lower housing is closed against the upper housing, the cushion damper and the cradle are both in contact with the vessel to secure the vessel with respect to the capture device.

11. A method of capturing a vessel within a capture device, the method comprising:
   positioning an upper housing of a capture device to be along a trajectory of a vessel;
   receiving the vessel between one or more locking arms of the capture device and the upper housing by facilitating movement of the one or more locking arms radially away from each other upon application of a force from the vessel that is axially toward a cushion damper of the upper housing;
   retaining the vessel between the one or more locking arms and the upper housing by facilitating movement of the one or more locking arms radially toward each other upon application of a force from the vessel that is axially away from the cushion damper.

12. The method of claim 11, further comprising closing a lower housing of the capture device against the upper housing.

13. The method of claim 12, wherein the closing comprises securing the vessel between and in contact with both a cushion damper of the upper housing and a cradle of the lower housing.

14. The method of claim 11, wherein the vessel travels along the trajectory in a zero gravity environment.

15. The method of claim 11, wherein receiving the vessel comprises enlarging a maximum distance separating a pair of the one or more locking arms to be larger than a maximum cross-sectional dimension of the vessel.

16. The method of claim 11, wherein receiving the vessel comprises facilitating rotation of each of the one or more locking arms about a pivot.

17. The method of claim 11, wherein receiving the vessel comprises facilitating bending of each of the one or more locking arms with respect to the upper housing.

18. The method of claim 11, wherein receiving the vessel comprises receiving the vessel with a convex outer surface of the one or more locking arms, the convex outer surface facing away from the upper housing.

19. The method of claim 11, wherein retaining the vessel comprises retaining the vessel with a concave inner surface of the one or more locking arms, the concave inner surface facing toward the upper housing.

* * * * *